United States Patent

Naka et al.

[11] Patent Number: 5,890,024
[45] Date of Patent: Mar. 30, 1999

[54] CAMERA HAVING SHUTTER CHARGING MECHANISM

[75] Inventors: Yoji Naka; Masashi Takamura; Hiroshi Sohma, all of Asaka; Kazuhiko Onda, Omiya, all of Japan

[73] Assignees: Fuji Photo Film Co., Ltd., Kanagawa; Fuji Photo Optical Co., Ltd., Saltama, both of Japan

[21] Appl. No.: 22,116

[22] Filed: Feb. 11, 1998

Related U.S. Application Data

[62] Division of Ser. No. 728,073, Oct. 9, 1996, Pat. No. 5,749, 009.

[30] Foreign Application Priority Data

Oct. 9, 1995 [JP] Japan ..................................... 7-261175
Feb. 20, 1996 [JP] Japan ..................................... 8-031756

[51] Int. Cl.$^6$ .................................................. G03B 17/42
[52] U.S. Cl. .......................... 396/395; 396/401; 396/413
[58] Field of Search ..................................... 396/387, 395, 396/396, 397, 399, 400, 401, 411, 413

[56] References Cited

U.S. PATENT DOCUMENTS 5,585,877 12/1996 Huang et al. ............................ 396/399
5,790,900 8/1998 Katsura et al. ..................... 396/395 X

*Primary Examiner*—Safet Metjahic
*Assistant Examiner*—J. K. Han
*Attorney, Agent, or Firm*—Sughrue, Mion, Zinn, Macpeak & Seas, PLLC

[57] ABSTRACT

A camera having a sprocket with a pair of cogs formed on a periphery for engaging a filmstrip having a row of perforations separated at alternate short and long intervals. The periphery is divided by the cogs into a frictional engaging section which provides frictional engagement of the periphery with the filmstrip and a mechanical engaging section which provides mechanical engagement of the cogs with the perforations. A shutter charging mechanism is operated by rotation of the sprocket driven by the filmstrip through the mechanical engagement between the filmstrip and at least part of the mechanically engaging section of the sprocket. A switch over mechanism disconnects the sprocket and the shutter mechanism in response to rewinding the filmstrip and a locking mechanism prevents reverse rotation of the sprocket in a specific position.

3 Claims, 14 Drawing Sheets

CAMERA HAVING SHUTTER CHARGING MECHANISM

This is a divisional of application Ser. No. 08/728,073 filed Oct. 9, 1996, now U.S. Pat. No. 5,749,009.

BACKGROUND OF THE INVENTION

1. Field of the Invention

This invention relates to a camera for use with a film of a format having a row of perforations spaced in a lengthwise direction at alternate long and short intervals, in which each adjacent perforations at the long interval delimit one picture frame and each adjacent perforations at the short interval delimit an interval between each adjacent picture frames, and, more particularly, relates to a camera which automatically withdraw a filmstrip by one picture frame from a film cartridge at every exposure and rewinds the entirely, or even partly, exposed picture frames into the cartridge.

2. Description of Related Art

Photographic filmstrips formed with a row of perforations, two for each picture frame, have recently become well known. Typically, each two perforations are positioned beside the beginning and end of a picture frame, respectively, to delimit a picture frame to be exposed and each adjacent perforations besides each adjacent picture frames delimits an interval between the adjacent picture frames. Accordingly, the perforations are spaced in a lengthwise direction at alternate long and short intervals. The sum of the long and short intervals comprise an film movement distance for one picture frame. Such a photographic filmstrip is known from, for example, Japanese Unexamined Patent Publication No. 5-19368.

A film winding mechanism for a filmstrip of this format, which can be provided at relatively low cost, uses a sprocket with a pair of cogs on the outer periphery which are spaced at a distance matching the short intervals between the respective adjacent perforations and engage with the perforations. The film winding mechanism includes a motor which is activated in response to operation of a shutter release button to cause film movement by one picture frame which is followed by a full rotation of the sprocket. This film winding mechanism cooperates with a mechanism for automatically stopping film winding at completion of winding one picture frame and a motor control switch for starting and stopping the motor such that the film wind stopping mechanism is activated every time one frame film movement is completed to turn off the motor control switch, stopping the motor. The film winding mechanism of this type is comprised of a film wind stopping cam having a groove which is rotatable following rotation of the sprocket and a stopping lever. The stopping lever engages with the film wind stopping cam to stop the sprocket whenever the sprocket makes a full rotation, stopping film winding. By means of the rotation of the sprocket following film movement, the shutter drive mechanism is charged.

While the film wind stopping mechanism thus constructed have the ability to cause reliable one frame film movement by mechanically detecting the perforations, the shutter charging mechanism performs shutter charge in a period where the cogs of the sprocket remain engaged with the perforations, so that the mechanism is resistant to bias on the shutter applied by a strong charging spring.

With the film winding mechanism of this type, when a film rewind member is operated after completion of sequential exposures of the first to last picture frames, while the sprocket 27 is disconnected in operation from the film wind stopping mechanism and the shutter charging mechanism and enabled to rotate freely, the motor control switch is turned over to reverse the motor for rewinding the filmstrip. Because the sprocket has been rotatable freely, the exposed filmstrip is entirely rewound into the film cartridge without hinderance.

A recurring problem, however, is that since the sprocket is intermittently rotated by the filmstrip during being rewound, a position in which the sprocket stops when the film trailing end comes off the sprocket varies with variations in rewinding force of the filmstrip. Variations in stop position cause various problems. Specifically, if the sprocket has stopped with its cogs placed in the film path, a filmstrip at its leading end is caught by the cogs at the beginning of winding and hindered from being further wound. Even if the filmstrip is possibly wound, the film wind stopping mechanism is activated and stops the motor during winding the filmstrip.

Such a variation in stop position of the sprocket causes another problem in cases where the camera is equipped with a feature that the motor is automatically stopped after a specified margin time from shutter releasing in the event that film winding is disabled. During winding a filmstrip after the exposure of the last picture frame, the sprocket is not rotated by the trailing section of the filmstrip which is not provided with perforations, so that the film wind stopping mechanism is not activated, resulting in not turning off the motor control switch and allowing the motor continues to rotate in the forward direction. In order for the motor to automatically stop even when the film wind stopping mechanism is not activated, an electric timer which makes use of a discharging time of a condenser is incorporated to count a margin time, for instance 15 seconds, from shutter releasing in order to automatically stop the motor after the lapse of the margin time.

Assuming that the film rewind member is operated immediately after the exposure of the last picture frame to reverse the motor and restored after the filmstrip has been entirely rewound into the film cartridge, in cases where a filmstrip of a small number of exposures, for example 15 exposures, which takes only a short time to be completely rewound, is loaded, the electric timer has possibly not yet count the margin time when the film rewind member is restored. In this event, although the motor has been switched over to be ready for forward rotation, it is not activated even if the margin time has not yet passed. This is because restoring the film rewind member causes the film rewind stopping mechanism to operate to turn on a motor stop switch as long as the sprocket is in the proper stop position.

In cases where the sprocket stops in a position deviating from the proper stop position in which the film rewind stopping mechanism is caused to operate, if the eclectic timer has not yet counted the margin time, the motor starts to rotate in the forward direction to withdraw the filmstrip out of the film cartridge again.

SUMMARY OF THE INVENTION

It is an object of the invention to provide a camera for use with a filmstrip having a row of perforations spaced at alternate short and long intervals and are arranged with two kinds of intervals such that a picture frame is defined between adjacent two of the perforations spaced at the long interval and an interval between adjacent two picture frames is defined between adjacent two of the perforations spaced at the short interval.

It is another object of the invention to provide a camera which can resolve the problem caused by variations in stop position of a sprocket which stops every time the filmstrip is wound by one frame.

The aforesaid objects of the invention are achieved by providing a camera comprising: a sprocket having at least a pair of cogs formed on a periphery and engageable with the perforations, the periphery being divided by the cogs into a frictional engaging section which provides frictional engagement of the periphery with the filmstrip by means of which the sprocket rotates following movement of the filmstrip and a mechanically engaging section which provides mechanical engagement of the cogs with the perforations by means of which the sprocket rotates following movement of the filmstrip; a counter mechanism including an exposure counter disk for indicating a number of exposures, the exposure counter disk stepping from a start position following rotation of the sprocket for advancing movement of one picture frame and stepping back to the start position following reverse rotation of the sprocket for rewinding movement of the filmstrip; and a locking mechanism for locking the sprocket in a specified position when the exposure counter disk returns to the starting position.

The locking mechanism may include a rotary member with a jaw formed on a periphery which is rotatable together with the sprocket; a locking lever with a claw engageable with the jaw, which is movable between a locking position where the locking lever engages with the jaw to lock the rotary member so as thereby to stop the sprocket in a specified position and an unlocking position where the locking lever is retreated apart from the rotary member; and a cam member cooperating with the exposure counter disk for retaining the locking lever in the unlocking position when the exposure counter disk is out of the starting position and releasing the locking lever to permit the locking lever to move toward the locking position when the exposure counter disk returns to the starting position. The claw and the jaw are preferably shaped so as to be convenient for gnawing engagement. The cam member may be installed to the exposure counter disk.

The locking lever may be formed integrally with an elastic arm and the exposure counter is provided with a biasing projection, the biasing projection being brought into engagement with the elastic arm to elastically deform the elastic arm during return of the exposure counter disk toward the starting position so as thereby to urging the locking lever toward the locking position.

According to another aspect of the invention, the camera comprises: a sprocket having at least a pair of cogs formed on a periphery and engageable with the perforations, the periphery being divided by the cogs into a frictional engaging section which provides frictional engagement of the periphery with the filmstrip by means of which the sprocket rotates following movement of the filmstrip and a mechanically engaging section which provides mechanical engagement of the cogs with the perforations by means of which the sprocket rotates following movement of the filmstrip; a shutter charging mechanism cooperative with the sprocket for performing shutter charging by means of rotation of the sprocket driven by the filmstrip through the mechanical engagement between the filmstrip and at least part of the mechanically engaging section of the sprocket; switch over means for operationally disconnecting the sprocket and the shutter charging mechanism in response to rewinding the filmstrip to permit the sprocket to rotate following rewinding movement of the filmstrip; and locking means for preventing reverse rotation of the sprocket in a position out of a section where the shutter charging mechanism performs shutter charging for a period from when the cogs come off from foremost two of the perforations to when a leading end of the filmstrip leaves from the sprocket.

The camera may further comprises means for preventing forward rotation of the sprocket in a position where the shutter charging mechanism completes shutter charging after having rewound a full length of the filmstrip, the means being activated to prevent the forward rotation of the sprocket in response to movement of manually operative rewinding means to an initial position and deactivated to permit the forward rotation of the sprocket following movement of the filmstrip.

With the camera of the invention, it is prevented to catch a leading end of a filmstrip by the cogs at the beginning of winding and, in addition, to stop the motor due to operation of the film wind stopping mechanism during winding the filmstrip.

Because the position in which the sprocket stops when the exposure counter disk returns to the start position is specified, it is easy to install a mechanism to stop the motor so as to stop the sprocket in the specified position.

In cases that the film rewind member is operated immediately after the exposure of the last picture frame to reverse the motor and restored after the filmstrip has been entirely rewound into the film cartridge, even in the event that the electric timer has not yet count the margin time when the film rewind member is restored, it is prevented that the motor is activated to withdraw out of the film cartridge again.

When the last picture frame is exposed, the filmstrip is rewound and stored in a film cartridge. As the film is rewound, the counter plate 49 counts down to the original count position, and is assisted in the task by the rotation of the intermittent sprocket 27, which is moved by rewinding the film. When the counter plate 49 has completely returned to the start position, the rotation of the intermittent sprocket 27 becomes locked by a locking means, such as a lock lever 55, at a position outside the section where the pair of cogs 27a and 27b perform a shutter charging, thereby overcoming the inconvenience experienced with the prior art of having the film come off while rewinding the film, stopping the intermittent sprocket 27 when the pair of cogs are in the section to perform a shutter charging, and causing the end of the film to hit the pair of cogs.

After the last picture frame has been exposed, the film rewinding operation is performed. As part of this operation, the switching means cuts off the interlock between the sprocket and the shutter charging mechanism, and allows reverse rotation of the sprocket 27. While the filmstrip is being rewound, the sprocket 27 is rotated by means of frictional engagement of the outer periphery of the sprocket with the filmstrip until a perforation arrives and subsequently stopped with the leading one of the pair of cogs in contact with the filmstrip. Further, when a pair of perforations arrive, the sprocket is intermittently rotated in the rewinding direction by means of the mechanical engagement of the pair of cogs with the filmstrip.

After the two cogs of the sprocket have come off the foremost two perforations on the side of leading end, the sprocket is rotated by means of frictional engagement of the outer periphery of the sprocket with the filmstrip and, afterward, stops with one of the cogs being in contact with the filmstrip. It is rotated again by means of frictional engagement when the filmstrip has gone. Subsequently, the locking means locks the reverse rotation of the sprocket in a position immediately prior to where the cogs charges the shutter charging mechanism. Because this state is one in which the locking means directs the frictional rotation area of the sprocket toward the film path, or in which both cogs are retreated from the film path, this is regarded as a position where there is no load from the spring of the shutter charging mechanism. Therefore, there are no problems of film winding when another roll of filmstrip is loaded. Furthermore, because only the reverse rotation of the sprocket is locked and the forward rotation of the sprocket is allowed, advancement of another roll of a filmstrip can be performed without any problems.

BRIEF DESCRIPTION OF THE DRAWINGS

The above and other features, aspects, and advantages of the present invention will be clearly understood from the following description with respect to the preferred embodiment thereof when considered in conjunction with the accompanying drawings, in which.

DETAILED DESCRIPTION OF THE SPECIFIC EMBODIMENT

Figure 1:
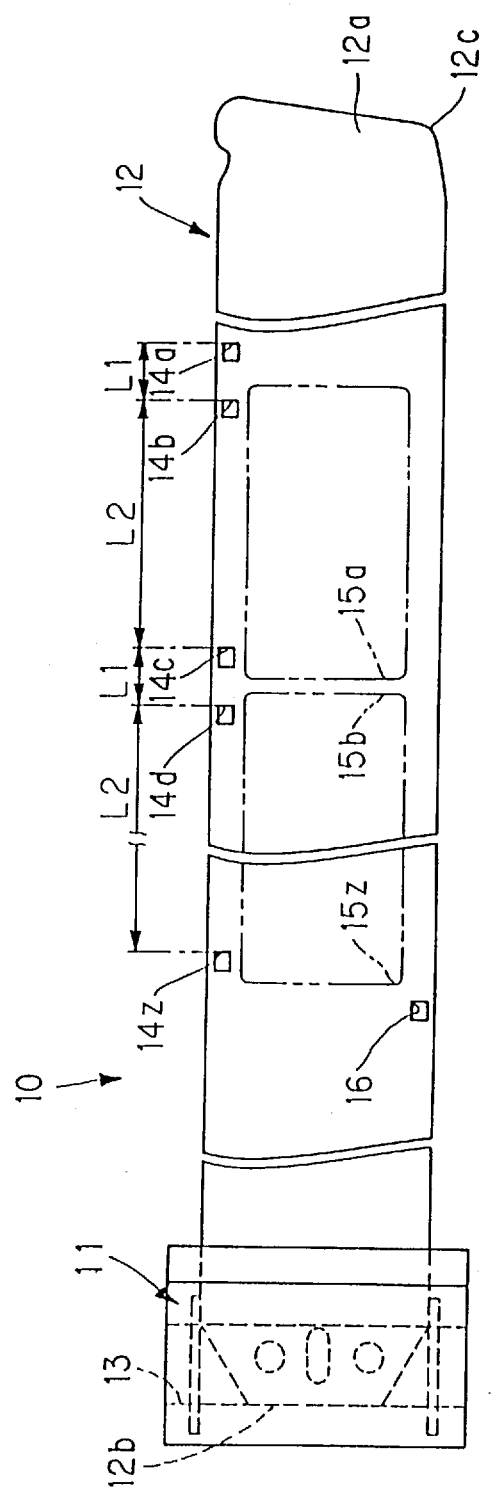
FIG. 1 is a plan view of a cartridge film for use with a camera in accordance with the invention.

Referring to the drawings in detail, and, in particular, to FIG. 1, a photographic film 10 comprises a film cartridge 11 and a filmstrip 12 having a format in which perforations are separated at alternate long and short intervals. The film cartridge 11 has a spool 13 on which the filmstrip 12 is wound around and which is rotated by a motor (see FIG. 2) to expel the filmstrip 12 out of the film cartridge 11. The filmstrip 12 is formed with a row of frame-positioning perforations 14a to 14z in one of marginal sections. These frame-positioning perforations 14a–14z are separated at alternate short and long intervals L1 and L2. Specifically, alternate perforations are positioned besides the beginning of picture frames 15a to 15z, and another alternate perforations are positioned besides the ends of the picture frames 15a–15z. Accordingly, one picture frame is delimited between each adjacent perforations separated at the long interval L2, and a space between each adjacent picture frames is delimited by each adjacent perforations separated at the short interval L1. For example, a picture frame 15a is delimited between adjacent perforations 14b and 14c separated at the long interval L2, and adjacent picture frames 15a and 15b are separated at the short interval L1 between adjacent perforations 14c and 15d separated at the short interval L1.

A film winding mechanism, which will be described in detail later, advances the filmstrip 12 such that the center between each two perforations separated at the long interval L2 is aligned with the center in the lengthwise direction of an exposure aperture of a camera to provide a picture frame in conformity in size with the exposure aperture. A single frame advancing distance is equal to the length of the sum of the short and long intervals L1 and L2.

At the trailing section 12b of the filmstrip 12 after the last picture frame 15z, a film end perforation 16 is formed in another marginal section opposite to the marginal section in which the perforations 14 are formed. This film end perforation 16 is detected by the camera to indicate that the filmstrip 12 is withdrawn out of the film cartridge 11 to the trailing end. The film end perforation 16 is separated from the last positioning perforation 14z at an interval shorter than the short interval L1 in the direction in which the filmstrip 12 is advanced.

Figure 2:
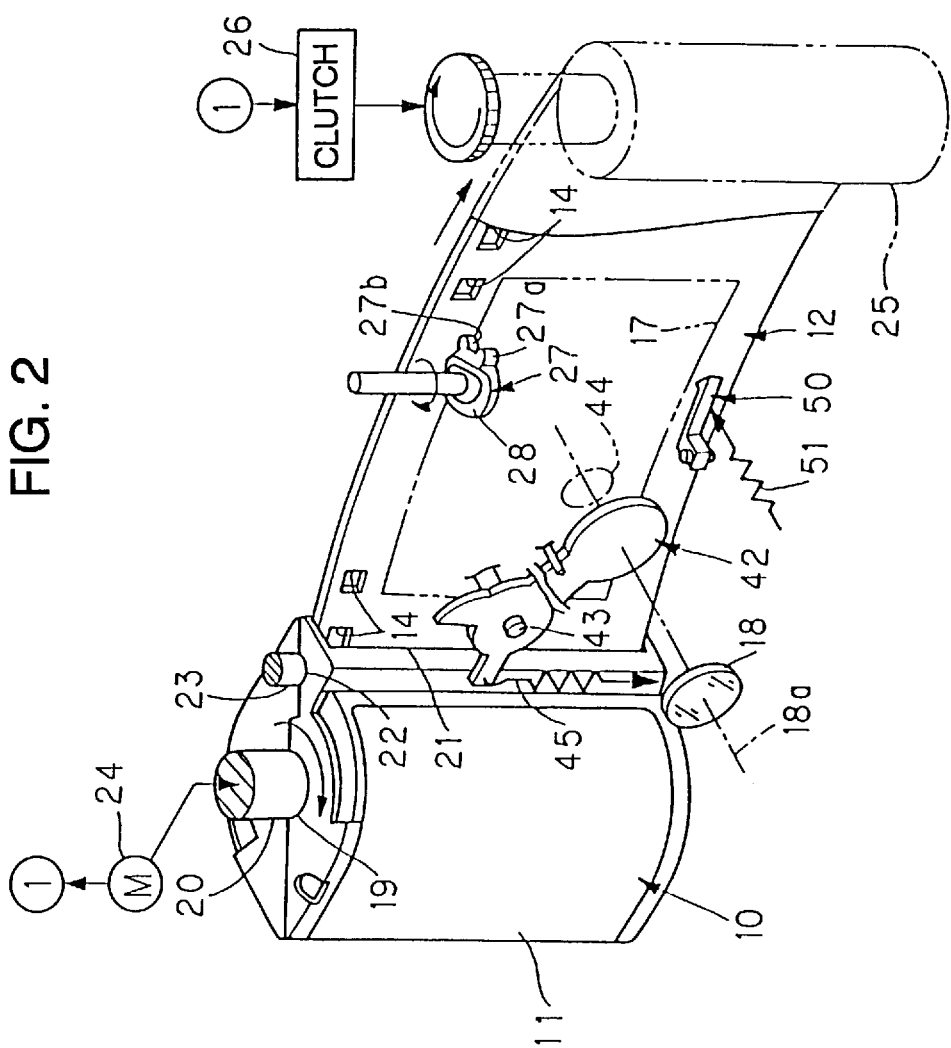
FIG. 2 is a schematic perspective view showing the essential part of a film wind stopping mechanism installed in the camera.

FIG. 2 schematically shows the camera having a cartridge camber (not shown) on one side of an exposure aperture 17 and a film wind-up chamber (not shown) on another side of the exposure aperture 17. This exposure aperture 17, together with a film path behind it, has a configuration concave as viewed from a taking lens 18. The film cartridge 10 is loaded into the cartridge chamber holding the spool 13 in alignment with the center ling of the cartridge chamber. The spool 13 at its one end is formed with a key groove 19 which exposes to the exterior of the film cartridge 11. When the film cartridge 11 is loaded in the camera, the spool 13 at the key-grooved end is engaged with and rotated by a spool drive shaft 20 installed in the cartridge chamber of the camera.

An active light lock door (which is hidden within the film cartridge in FIG. 2) is built into the cartridge 11 such that it is rotatable between a light locking position where it close a film egress/ingress slot 21 to prevent ambient light from entering the interior of the film cartridge 11 and an unlocking position where it allows the filmstrip 12 to be pushed out and pulled in. The light lock door at its one end is formed with a key groove 22 which exposes to the exterior of the cartridge 11. When the film cartridge 11 is loaded in the camera, the light lock door at the key-grooved end is engaged with and rotated by a drive shaft 23 installed in the cartridge chamber between the locking and unlocking positions. The drive shaft 23 is linked with a locking member for locking a rid of the cartridge chamber in the closing position such that the drive shaft 23 is turned in response to locking operation of the locking member to bring the light lock door into the unlocking position and turned back in response to unlocking operation of the locking member to bring the light lock door into the locking position. The drive shafts 20 and 23 are installed deep in the cartridge chamber and designed and adapted such that they are smoothly brought into engagement with the key grooves 19 and 22, respectively, when the film cartridge 10 is loaded in the camera along the axis of the cartridge chamber.

The motor 24 is activated to rotate in the forward direction in which the filmstrip 12 is withdrawn out of the film cartridge 11 after the light lock door is turned into the unlocking position in response to locking the rid to close the cartridge chamber. Rotation of the motor 24 is reduced by a gear train and transmitted to the drive shaft 24 to rotate the spool 13 in the film withdrawing direction. The filmstrip 12 is advanced along the film path behind the exposure aperture 17 to the film wind-up chamber. A film winding spool 25 is installed in and supported for rotation by the film wind-up chamber. Rotation of the motor 24 is also transmitted to the film winding spool 25 through a gear train at reduced speed to wind the filmstrip 12 from the leading end 12a toward the leading end. Between the motor 24 and the spool drive shaft 20 there is interposed a slipping mechanism which absorbs the difference between revolution of the motor 24 and convolutions of the filmstrip 12 which increases in diameter as the filmstrip 12 is wound around the film winding spool 25.

Figure 6:
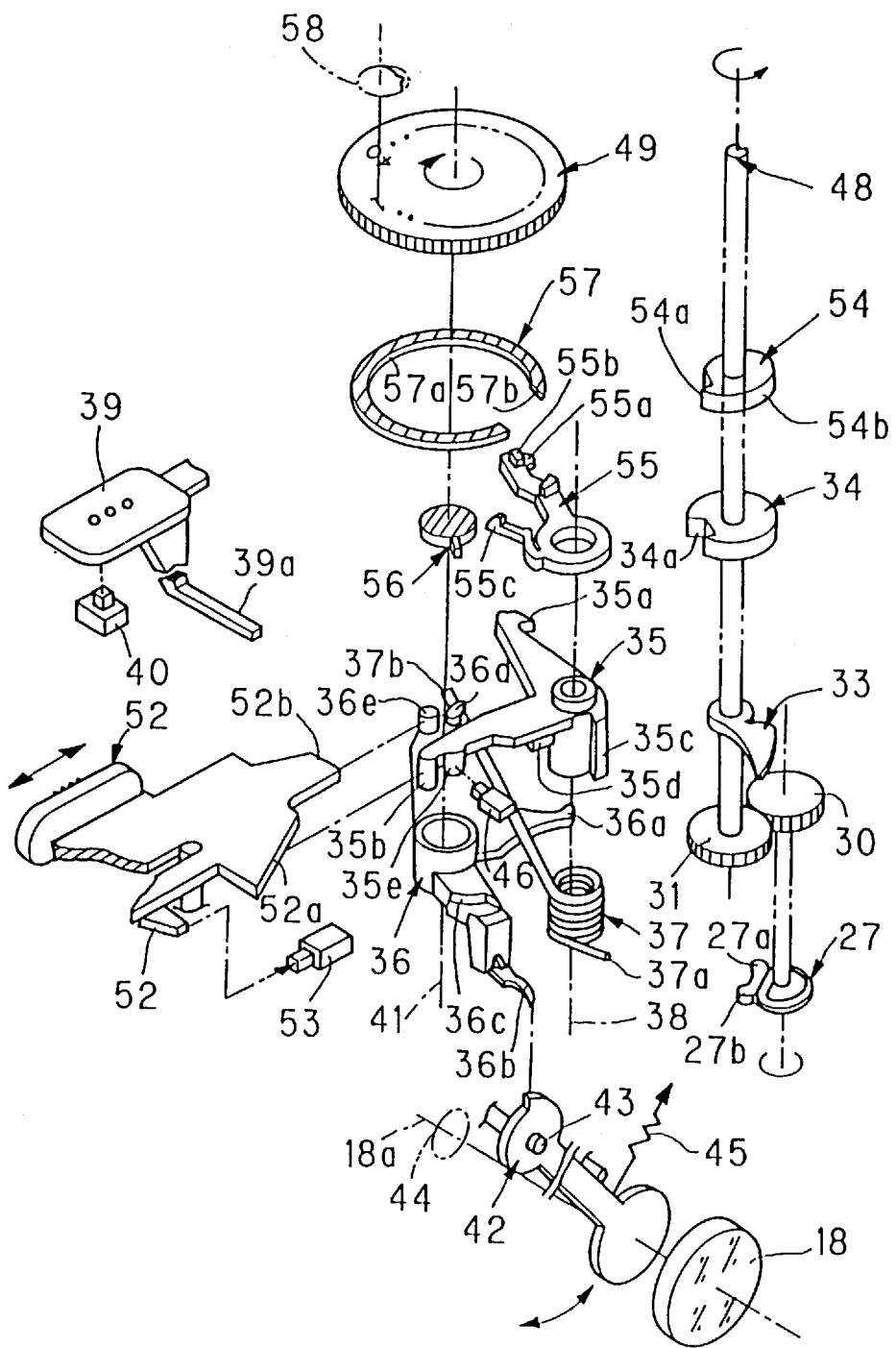
FIG. 6 is an exploded view schematically showing the film winding/rewinding mechanism.

Film rewinding is performed after exposure has been made onto the last picture frame 15z by the motor 24 driven in the reverse direction in response to operation of a film rewind knob 52 (see FIG. 6). At this time, a clutch 26 interposed between the film winding spool 25 and the motor 24 disconnects transmission of rotation in the reverse direction of the motor 24 to the film winding spool 25 and consequently, the filmstrip 12 is rewound into the interior of the film cartridge 11 by means of the rotation of the spool 13 in the reverse direction.

In a position above the aperture 17 and deviated toward the film winding chamber from the axis of exposure 18a as viewed from the side of the taking lens 18, there is provided a rotatable sprocket 27 installed for rotation. This rotatable sprocket 27 is equipped with two cogs 27a and 27b which are brought into engagement in turn with a pair of perforations 14 separated at the short interval L1 when the filmstrip 12 is advanced. The locus of revolution of the outer periphery of the cogs 27a and 27b cuts into the film path. A trailing end detection claw 50 is provided below the rotatable sprocket 27 and is engageable with the film end perforation 16. This trailing end detection claw 50 turns between an engaged position in which it engages with the film end perforation 16 to detect the trailing end of the filmstrip 12 and a disengaged position in which it is out of a path of the film end perforation 16, and is given a bias toward the engaged position by means of a return spring 51. Further advancing movement of the filmstrip 12 is obstructed by the engagement of the trailing end detection claw 50 with the film end perforation 16. As apparent from FIG. 1, the leading end 12a of the filmstrip 12 has a tapered shape 12c on the line extending from the film end perforation 16, so as to prevent the trailing end detection claw 50 from being caught by the leading end.

Figure 3:
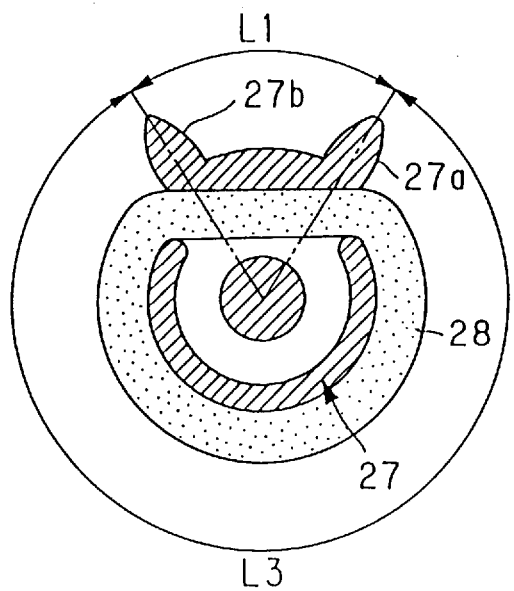
FIG. 3 is a cross-sectional view in a plane perpendicular to an axis of a sprocket.
Figure 4:
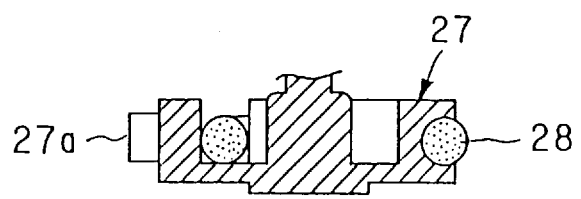
FIG. 4 is a cross-sectional view taken along line IV—IV of FIG. 3.
Figure 5:
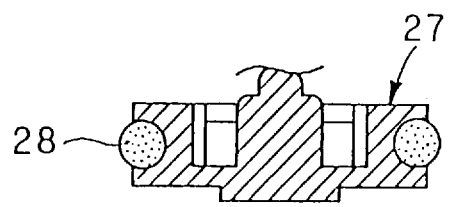
FIG. 5 is a cross-sectional view taken along line V—V of FIG. 3.

As shown in FIGS. 3 through 5, the rotatable sprocket 27 having a pair of cogs 27a and 27b separated at the short interval L1 is provided with a rubber band 28 attached onto the circular arcuate outer periphery between the cogs 27a and 27b having a circumferential length L3 which is shorter than the long intervals L2 at which the alternate perforations 14a–14z are arranged. In other words, the short interval L1 is a distance that the rotatable sprocket 27 can turn round following the advancing movement of the filmstrip 12 while the cogs 27a and 27b remain engaged with the perforations 14. On the other hand, the interval L3 is a distance that rotatable sprocket 27 can move round following the advancing movement of the filmstrip 12 while the rubber band 28 remains frictional contact to the filmstrip 12.

The sprocket 27 intermittently rotates following the advancing movement of the filmstrip 12. In more detail, the filmstrip 12 is advanced by one picture frame immediately after every exposure and stops when the film winding mechanism is activated to automatically stop the advancing movement of the filmstrip 12. Specifically, the leading cog 27a along the rotating direction gets out of the perforation 14, and the following cog 27b is brought into engagement with the succeeding perforation 14, reaching the film wind stopping position.

The rubber band 28 rotates the intermittent sprocket 27 by friction with the film 12 while both cogs 27a and 27b remain disengaged from the perforations 14 during a single frame advancing movement of the filmstrip 12, and after the leading cog 27a has come into contact with the filmstrip 12 to separate the filmstrip 12 from the rubber band 28 and the sprocket 27 is consequently disabled to rotate, slippage between the leading cog 27a and the filmstrip 12 is allowed until the leading cog 27a becomes engaged with the succeeding perforation 14. In this manner, the sprocket 27 intermittently rotates following the advancing movement of the filmstrip 12.

Figure 10:
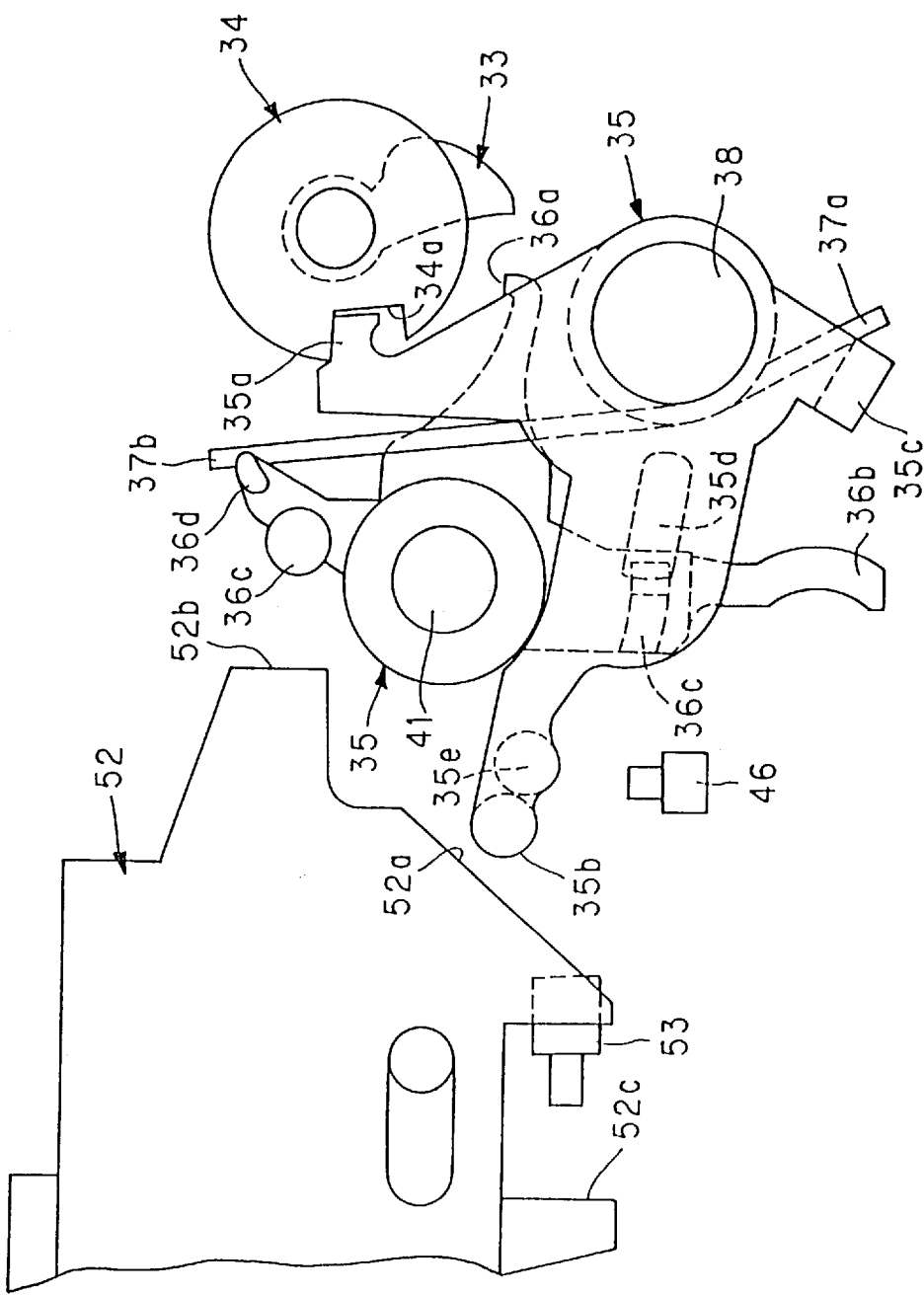
FIG. 10 is an explanatory view showing the film wind stopping mechanism and the shutter charging mechanism in their initial positions.

As shown in FIG. 6, the rotation of the sprocket 27 is transmitted to the shutter charging mechanism, the film wind stopping mechanism, an exposure counter mechanism, a locking mechanism, etc. through a gear 30 installed coaxially with the sprocket 27 and a gear 31 in mesh with the gear 30. The shutter charging mechanism and the film wind stopping mechanism are comprised of a shutter charging cam 33, a film wind stopping disk 34, a stopper lever 35, a shutter drive lever 36, a torsion spring 37, etc. Both shutter charging cam 33 and film wind stopping disk 34 are fixedly attached to a cam shaft 32 of the gear 31, and cooperate with the sprocket 27. The film wind stopping disk 34 has a circular shape with a groove 34a formed in a specified position on its circumference. The stopper lever 35 is supported for rotation around a shaft (schematically shown by a center axis) 38, and is formed with an engaging claw 35a, a pressure receiving end 35b, a downward leg 35c, a downward projection 35d, and a switch pressing leg 35e which are all integral with the lever 35. The groove 34a is positioned in the rotational locus of the engaging claw 35a and engaged with the engaging claw 35a when the sprocket 27 reaches the film wind stopping position. The stopper lever 35 rotates to its film wind stopping position (see FIG. 10) where the engaging claw 35a is brought into engagement with the groove 34a to prevent rotation of the film wind stopping disk 34 in a counterclockwise direction as viewed in FIG. 6 subsequently to completion of shutter charging, so as thereby to prevent further rotation of the sprocket 27 in a clockwise direction. Upon completion of shutter release, the stopper lever 35 rotates into a retreated position where the engaging claw 35a retreats from the groove 34a to permit the sprocket 27 to rotate. The torsion spring 37 has one end 37a engaged by the downward leg 35c of the stopper lever 35 and another end 37b engaged by a spring retainer 36d of the shutter drive lever 36 and gives the stopper lever 35 a bias around the shaft 38 toward the film wind stopping position. The switch pressing leg 35e turns on a switch 46 when the stopper lever 35 rotates and reaches the retreated position. When the shutter drive lever 36, which will be described in details later, rotates and reaches its shutter charging position, the downward projection 35d comes into the rotational locus of an upward projection 36c of the shutter drive lever 36 and holds the shutter drive lever 36 in the shutter charging position as shown in FIG. 10. The downward leg 35c is pushed down toward the retreated position by a rod 39a forming a lower section of a shutter release button 39 upon shutter release. When the stopper lever 35 has moved to the retreated position, the downward projection 35d retreats from the rotational locus of the upward projection 36c of the shutter drive lever 36 and releases the holding of the shutter drive lever 36 in the charging position. The shutter release button 39 may be an elastic member, for example, formed by cutting out a part of a top wall of the camera body. Right below the shutter release button 39 there is installed a switch 40 which is turned on by the shutter release button 39.

Figure 11:
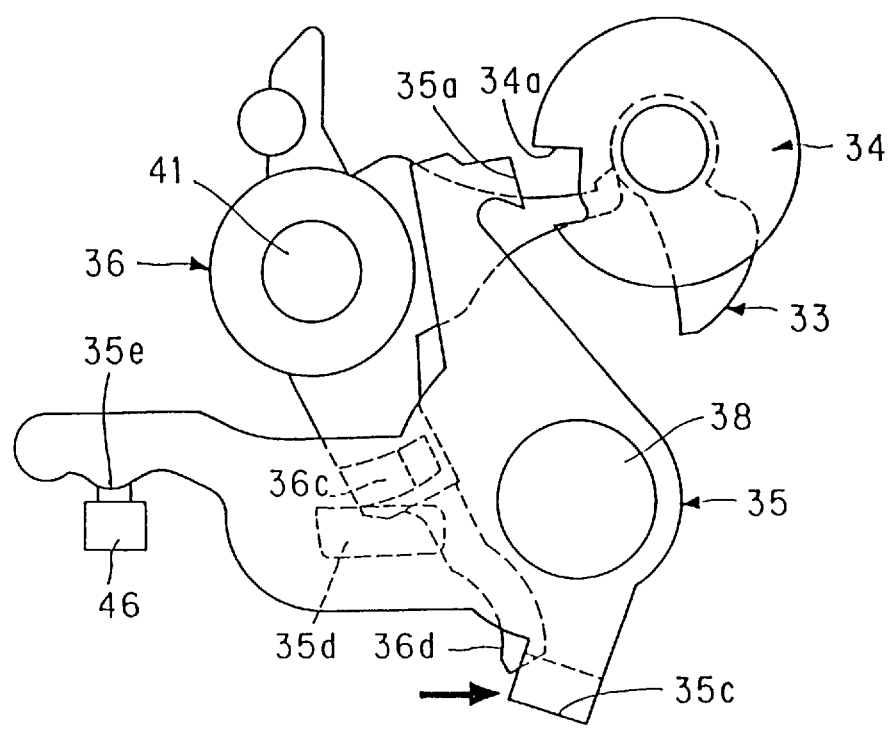
FIG. 11 is an explanatory view showing the film wind stopping mechanism and the shutter charging mechanism after shutter releasing.

In the rotational locus of the shutter charging cam 33, there is positioned an engaging end 36a of the shutter drive lever 36 as shown in FIG. 11. The shutter drive lever 36 is rotatable around a shaft (schematically shown by a center axis) 41 and formed with a striking arm 36b, an upward projection 36c, a spring retainer arm 36d and a pressure receiving projection 36e, in addition to the engaging end 36a, which are all integral with the lever 36. Rotation of the shutter drive lever 36 is performed between a shutter charging position (see FIG. 10) where the engaging end 36a is pushed by the shutter charging cam 33 to charge the shutter and a releasing position to which the shutter drive lever 36 is forced by the torsion spring 37 to turn back in the counterclockwise direction.

The striking arm 36b strikes away a shutter blade 42 on the way that the shutter drive lever 36 is rotated by the torsion spring 37 from the charging position to the releasing position. The shutter blade 42 rotates around a shaft 43 against a return spring 45 in the clockwise direction as viewed in FIG. 6, permitting light to pass through a shutter opening 44. Subsequently, it returns to the original position instantaneously by the return spring 45. When the shutter drive lever 36 rotates to the releasing position, the upward projection 36c comes into the rotational locus of the downward projection 35d and holds the stopper lever 35 in the retreated position.

While the sprocket 27 is rotated by advancing the filmstrip 12 by one picture frame, the shutter charging cam 33 rotates the shutter drive lever 36 from the releasing position toward the charging position against the torsion spring 37. Therefore, the shutter charging cam 33 is designed and adapted in shape so that shutter charging is performed through the rotational force of the sprocket 27 while both cogs 27a and 27b remain engaged with the perforations 14. As shown in FIG. 10, because the shutter charging cam 33 stops immediately after a position where it crosses over the rotational locus of the engaging end 36a of the shutter drive lever 36, the shutter drive lever 36 is able to rotate to the releasing position by means of subsequent shutter release operation.

The exposure counter mechanism is comprised of a single-cog gear 48 formed at the top end of the cam shaft 32 and a counter disk 49 formed with teeth 49a. The single-cog gear 48 is brought into engagement with a tooth and advances the counter disk 49 by one count through the engagement while the sprocket 27 makes one revolution. The counter disk 49 is mounted for rotation on the shaft 41 and is marked out with even intervals on the surface. This mark indicates the number of exposed picture frames in incremental order through a display window 58 formed in the wall of the camera body.

The motor 24 drives in a forward direction in which the filmstrip 12 is advanced to the film wind-up chamber when the stopper lever 35 rotates to the retreated position to turn on the switch 46 and the shutter button 39 is depressed over to turn off the switch 40. When stopper lever 35 rotates to the film wind stopping position following the film advancing movement by one picture frame, the switch 46 is turned off, stopping the motor 24.

After the filmstrip 12 is fully or partly exposed, the filmstrip 12 is permitted to be rewound into the film cartridge 11 by manually sliding the film rewind knob 52, which is exposed on the exterior of the camera body, from its normal position to rewind position. This film rewind knob 52 is formed with two pressing sections 52a and 52b and the switching projection 52c, as integral parts. When the film rewind knob 52 is moved to the rewind position, the two pressing sections 52a and 52b press the pressure receiving end 35b of the stopper lever 35 and the pressure receiving projection 36e of the shutter drive lever 36, respectively, forcibly rotating the stopper lever 35 and the shutter drive lever 36 to the retreated position and the charging position, respectively, and holds them in these positions. Thus, the transmission of rotation of the sprocket 27 to the film wind stopping mechanism and the shutter charging mechanism is disconnected, permitting rotation of the sprocket 27.

When the film rewind knob 52 is moved to the rewinding position, the switching projection 52c turns over the switch 53 to cause the motor 24 to rotate in the reverse direction, rewinding the filmstrip 12 into the film cartridge 11. During rewinding the filmstrip 12, the sprocket 27 rotates in the reverse direction keeping the cogs in engagement with the perforations 14, forcing the single-cog gear 48 to turn the counter disk 49 toward its starting position.

As the filmstrip 12 is rewound into the film cartridge 11, it is separated from the sprocket 27, leaving the sprocket 27 stopped. Although the sprocket 27 does not always stop in a fixed position, it always stops in a section within one revolution of the sprocket 27 where the shutter charging is performed. In this instance, if a stopped position of the sprocket 27 deviates from the initially specified stop position, there will be the inconvenience such as inability to perform the prescribed number of exposures, and inability to advance the filmstrip 12 for another exposure.

Figure 8:
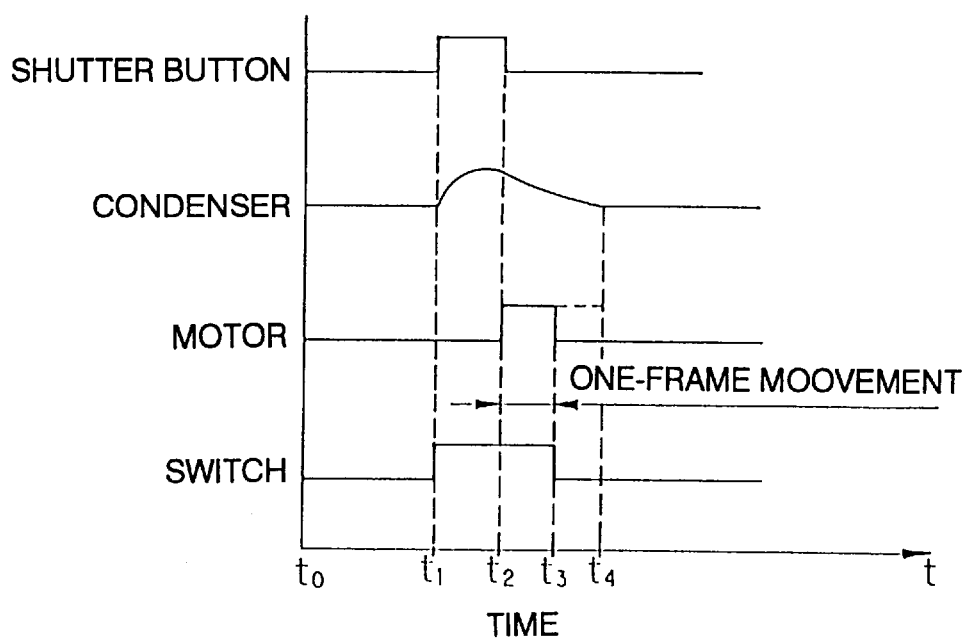
FIG. 8 is a time chart of motor control.

In order to eliminate that inconvenience, there is installed a locking mechanism to lock the sprocket 27 in the initially specified position or its initial position while the leading section 12a comes off the sprocket 27. This locking mechanism is comprised of a rotatable locking cam 54 secured to the cam shaft 32, a locking lever 55 mounted for rotation on the shaft 38, a locking lever biasing projection 56 integral with the counter disk 49, and a locking lever actuator cam ring 57 which is shaped in the form of a C-ring having a space 57b. The locking cam 54 is installed coaxially with the film wind stopping disk 34 interposed between the single-cog gear 48 and the film wind stopping disk 34, and is formed with a peripheral jaw 54a on the circumference thereof. As shown in FIG. 8, the locking lever 55, which is mounted for rotation on the shaft 38, is formed with an elastic arm 55c extending radially from the annular base section, an engaging claw 55a and an upward projection 55b. This locking lever 55 is movable between its locking position (FIG. 9) in which the engaging claw 55a engages with the peripheral jaw 54a of the locking cam 54 and a retreated position (FIG. 14) in which the engaging claw 55a is remote from the peripheral jaw 54a of the locking cam 54. The peripheral jaw 54a of the locking cam 54 does not come into engagement with the engaging claw 55a of the locking lever 55 during rotation in the direction in which the sprocket 27 advances the filmstrip 12 and is, however, engaged by the engaging claw 55a during rotation in the reverse direction in which the sprocket 27 is rotated by the filmstrip 12 being rewound. When the engaging claw 55a engages with the peripheral jaw 54a, it halts the sprocket 27 in the initial position which is slightly far away from the film wind stopping position in the film advancing direction and where the pair of cogs 27a and 27b get out of the perforations 14, namely a position where the cogs 27a and 27b gets away from the film path. The locking cam 54 is shaped so that its circumference 54b presses the engaging claw 55a to rotate the locking lever 55 toward the retreated position while the sprocket 27 rotates in the film advancing direction.

While the filmstrip 12 is being rewound, during a period from when the cogs 27a and 27b of the sprocket 27 come off the foremost two perforations 14a and 14b until the leading section 12a comes off the sprocket 27, namely immediately before the counter disk 49 returns the starting position where it indicates a sign "S" in the display window 58, the locking lever actuator ring 57 integral with the counter disk 49 places the space 57b in the rotational locus of the upward projection 55b and allows the locking lever 55 to rotate to the locking position. In other cases as well, namely while the filmstrip 12 is passing the sprocket 27, the inner wall 57a of the C-ring shaped locking lever actuator cam ring 57 is engaged by the upward projection 55b of the locking lever 55, preventing the rotation of the locking lever 55 toward the locking position.

Figure 9:
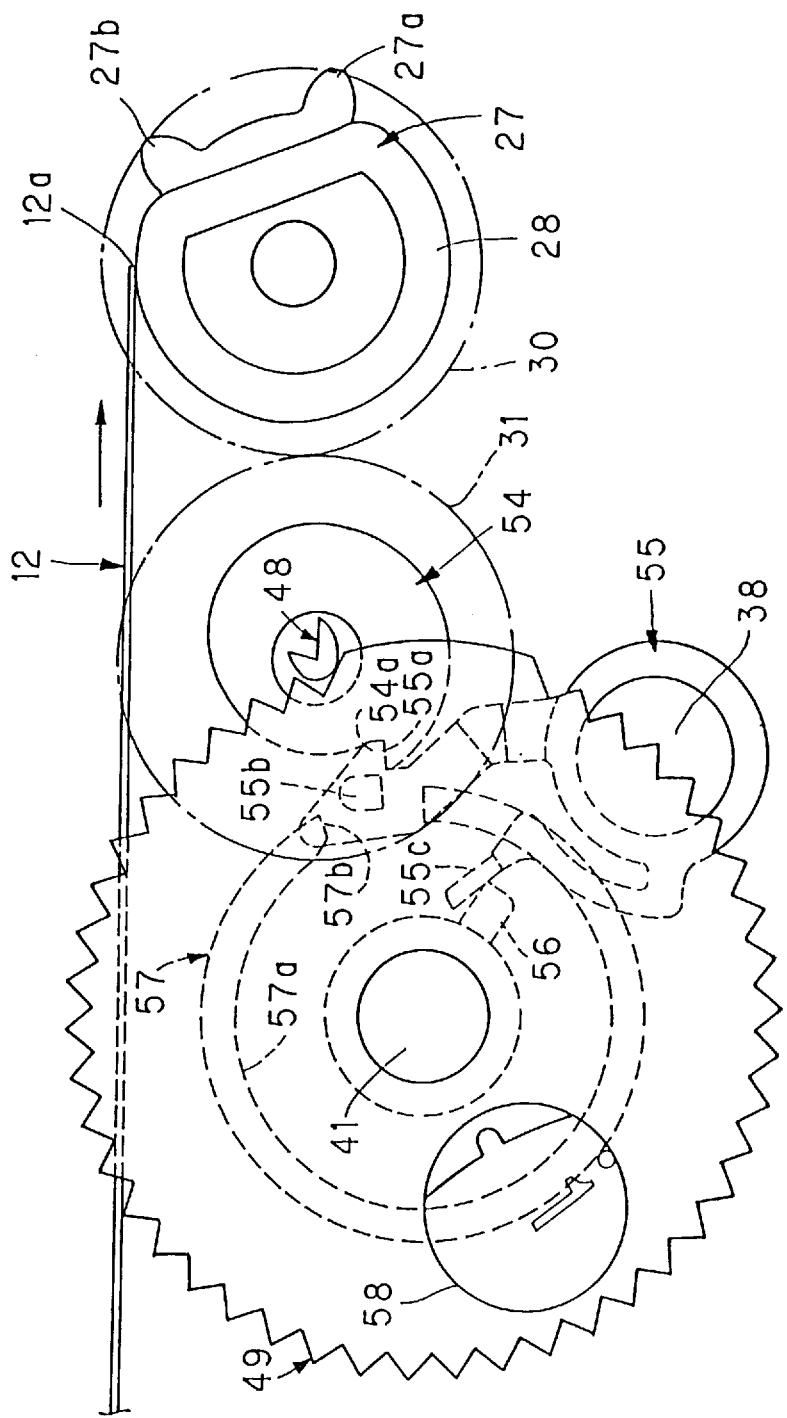
FIG. 9 is an explanatory view showing the film winding/rewinding mechanism, the locking mechanism and the counter mechanism in their initial positions.

The locking lever biasing projection 56 integral with the counter disk 49 depresses the elastic arm 55c of the locking lever 55 to urge the locking lever 55 toward the locking position immediately before the counter disk 49 returns to the starting position during rewinding the filmstrip 12. As a result, the space 57b of the C-ring shaped locking lever actuator cam ring 57 is placed in the rotational locus of the upward projection 55b immediately before the leading end 12a comes off the sprocket 27 during rewinding the filmstrip, and simultaneously, the locking lever 55 is allowed to move to the locking position. Then, when the counter disk 49 returns to the starting position, the engaging claw 55a is brought into engagement with the peripheral jaw 54a of the locking cam 54 as shown in FIG. 9, halting the sprocket 27 in the initial position. In this manner, the peripheral jaw 54a of the locking cam 54 and the engaging claw of the locking cam 55 cooperate together as the means for preventing reverse rotation of the sprocket 27 following movement of the filmstrip 12 rewound into the film cartridge 11.

When the sprocket 27 is in the film winding stopping position, the groove 34a of the film wind stopping cam 34 is placed in the rotational locus of the engaging claw 35a of the stopping lever 35. Specifically, while the engaging claw 35a remains engaged with the groove 34a, shutter charging is performed to rotate the shutter drive lever 36 to the charging position, causing the stopping lever 35 to rotate toward the film wind stopping position and bring the engaging edge 35a into engagement with the groove 34a. As a result, the sprocket 27 is prevented from further rotating. Because the groove 34a is widened in the direction in which the film wind stopping cam 34 rotates during film rewinding, even when the sprocket 27 is in the initial position, the groove 34a is placed in the rotational locus of the engaging claw 35a of the stopping lever 35, and therefor, when the film rewind knob 52 is returned to the normal position, the stopping lever 35 rotates to the film wind stopping position to bring the engaging claw 35a into engagement with the groove 34a. That is, the groove 34a and the engaging claw 35a cooperate together as a means for preventing forward rotation of the sprocket 27 following movement of the filmstrip 12 wound into the film wind-up chamber.

When the sprocket 27 is in the initial position, because the shutter charging cam 33 stops in the position past the rotational locus of the engaging end 36a of the stopping lever 36, the shutter drive lever 36 is permitted to rotate to the releasing position in response to shutter releasing, thus giving the sprocket 27 no load from the torsion spring 37.

Figure 7:
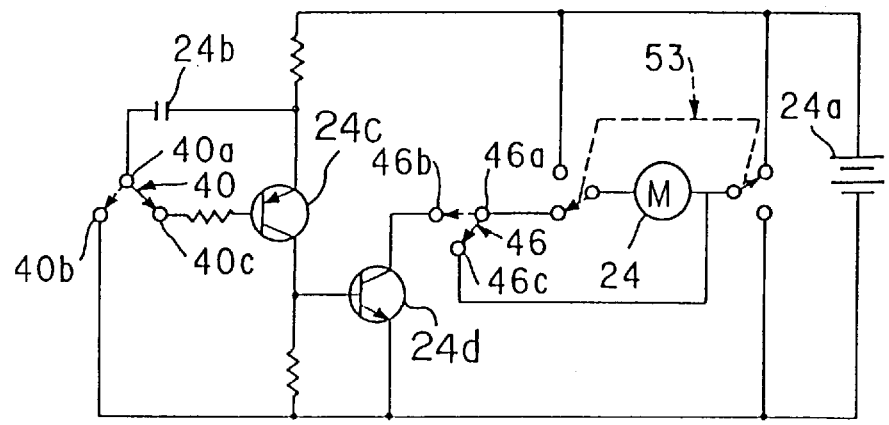
FIG. 7 is a diagram of a motor control circuit.

FIG. 7 shows a motor control circuit including a condenser 24b between a power source battery 24a and a motor drive circuit. As shown in FIG. 8 which is a time chart of motor control, when the shutter button 39 is depressed to turn on the switch 46 by connecting switch contact 46a with the switch contact 46b at a time ti, a charge of the condenser 24b starts. When the shutter button 39 is released with a result of connecting the switch contact 40a with the switch contact 40c to turn off the switch 40 at a time t2, shutting off the charging circuit of the condenser 24b and consequently, applying the charged voltage to the base of a transistor 24c.

The switch 46 is turned on by the stopping lever 35 moved to the retreated position following the depression of the shutter button 39 at the time ti, bringing the switch contact 40a into connection with the switch contact 40b. When the shutter button 39 is released at the time t2, the switch contact 40a is connected with the switch contact 40c to turn conductive the transistors 24c and 24d with the voltage supplied from the condenser 24b, causing the motor 24 to rotate in the forward direction and advance the filmstrip 12 by one picture frame. At a time t3 that the one-frame advancing movement of the filmstrip 12 is completed, the film wind stopping mechanism is operated to move the stopping lever 35 into a position shown in FIG. 10, connecting the switch contact 46a with the switch contact 46c to turn off the switch 46, interrupting the forward driving of the motor 24.

Because advancing movement of the film strip 12 after exposure of the last picture frame does not cause rotation of the sprocket 27, the film wind stopping mechanism does not operate, remaining the switch 46 turned on. With the motor control circuit, however, the condenser 24b functions as a timer for automatically interrupting the forward rotation of the motor 24 even when the switch 46 is not turned off. Specifically, the forward rotation of the motor 24 is automatically interrupted at a time t4 that the condenser 24b lowers its charged voltage to a specified level. When the switch 53 is changed to a reverse position by the film rewind knob 52, the motor 24 is reversed to rewind the filmstrip 12. Returning the film rewind knob 52 after having rewound the full picture frames into the cartridge 11 activates the film wind stopping mechanism to operate, stopping the motor 24.

Operation of the camera will be described hereafter with reference to FIGS. 9 through 17.

The bottom cover is opened to load a film cartridge 10 into the cartridge chamber of the camera. When the bottom cover is closed, in response to the closing action of the bottom cover, the drive shaft 23 rotates to have the light lock door of the film cartridge 11 turned to the unlocking position. Until this time, the counter disk 49 has returned in the starting position. When the counter disk 49 is in the starting position, as shown in FIG. 9, the space 57b of the locking lever actuator cam ring 57 is placed in the rotational locus of the upward projection 55b, and the elastic arm 55c of the lock lever 55 is pressed and urged by the locking lever biasing projection 56. Resultingly, the lock lever 55 rotates into the locking position, bringing the engaging claw 55a into engagement with peripheral jaw 54a of the locking cam 54 to prevent clockwise rotation of the cam shaft 32, and hence counterclockwise rotation of the sprocket 27. At this time, the sprocket 27 remains halted in the initial position where the pair of cogs 27a and 27b retreat from the film path.

At this time, the film wind stopping mechanism and the shutter charging mechanism are in a state shown in FIG. 10, locating the stopping lever 35 in the wind stop position to have the engaging claw 35a engaged with the groove 34a to prevent rotation of the sprocket 27 in the clockwise direction. Further, the stopping lever 35 has its downward projection 35d placed in the rotational locus of the upward projection 36c to hold the shutter drive lever 36 in the charging position.

The first frame advancing movement is initiated following depression of the shutter button 39. Specifically, when the shutter button 39 is depressed down at the time t1, the contacts 40a and 40b are connected as shown in FIG. 7 to turn on the switch 40, initiating charge of the condenser 24b by the voltage from the power source battery 24a. On the other hand, the depression of the shutter button 39 causes the rod 39a to press and rotate the stopping lever 35 in the counterclockwise direction to the retreated position. At this time, as shown in FIG. 11, the downward projection 35d retreats away from the rotational locus of the upward projection 36c and releases the hold of the shutter drive lever 36 in the charging position, causing the shutter drive lever 36 to instantaneously rotate in the counterclockwise direction and strike away the shutter blade 42 without exposing the filmstrip 12 because the filmstrip 12 has not yet been withdrawn from the film cartridge 11. Subsequently, the shutter drive lever 36 moves to the releasing position, thus holding the stopping lever 35 in the retreated position.

As shown in FIG. 11, when the stopping lever 35 moves to the retreated position, the switch 46 is turned on. At the time t2, when the shutter button 39 is released, the switch 40 is turned off, disconnecting the contacts 40a and 40c to cut off the charging of the condenser 24b and turn the transistors 24c and 24d conductive. As a result, the motor 24 drives in the forward direction to advance the filmstrip 12. In this instance, the filmstrip 12 has a leading section from the leading end 12a to the first picture frame 14a whose length is longer than the one frame length L1+L3.

Figure 12:
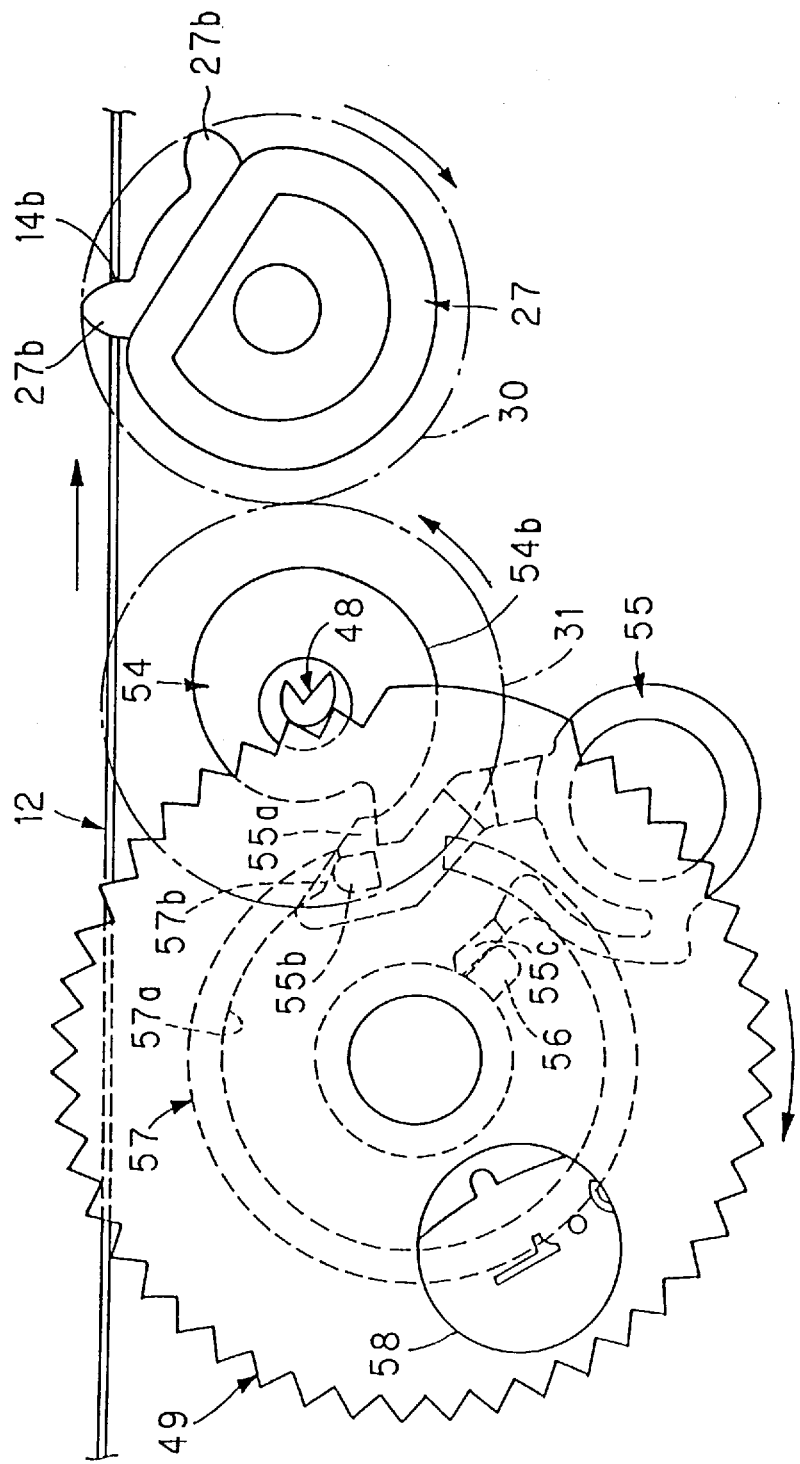
FIG. 12 is an explanatory view showing the sprocket, the locking mechanism and the counter mechanism when the first picture frame is in the exposure position.

The filmstrip 12 is withdrawn from the film cartridge 11 and forwarded to the film wind-up chamber pushing the trailing end detection claw 50 to the retreated position by the tapered end 12c of the leading end 12a, and then, wound around the film winding spool 25. During the advancing movement, the filmstrip 12 rotates the sprocket 27 in the clockwise direction. When the leading cog 27a of the sprocket 27 touches the filmstrip 12, the rubber band 28 slips against the filmstrip 12 to permit further advancing movement of the filmstrip 12 until the foremost perforation 14a reaches. While the filmstrip 12 continues to be advanced, the leading cog 27a engages with the first perforation 14a. The sprocket 27 is rotated by the filmstrip 12 until the leading cog 27a comes off the first perforation 14a and the following cog 27b engages with the second perforation 14b as shown in FIG. 12. In this event, the sprocket 27 is brought into the stopping position.

During this initial movement, the shutter charging cam 33 rotates the shutter drive lever 36 in the clockwise direction to the charge position where the upward projection 36c comes off the rotational locus of the downward projection 35d. Resultingly, the stopping lever 35 rotates in the clockwise direction toward the film wind stopping position under the influence of biasing force of the torsion spring 37 to bring the downward projection 35d into the rotational locus of the upward projection 36c and consequently hold the shutter drive lever 36 in the charging position as shown in FIG. 10.

When the stopping lever 35 rotates toward the film wind stopping position and reaches the position where the engaging claw 35a contacts with the outer circumference of the film wind stopping cam 34, the stopping lever 35 stops. When the sprocket 27 reaches the stopping position, the engaging claw 35a engages with the groove 34a, the stopping lever 35 is brought into the film wind stopping position to connect the contacts 46a and 46c as shown in FIG. 7, turning off the switch 46. Resultingly, the motor 24 is halted at the time t3 (FIG. 8) and the film wind stopping mechanism and the shutter charging mechanism return to the state shown in FIG. 10, completing the initial film advancement. Then, the first picture frame 15a is in alignment with the exposure aperture 17.

The exposure counter mechanism is in a condition where the single-cog gear 48 has advanced the counter disk 49 by one count through one revolution of the sprocket 27 during the initial advancement of the film, and when the first picture frame 15a is placed in position, the exposure number "1" is indicated in the display window 58 as shown in FIG. 12.

The locking mechanism is in a state where the locking lever biasing projection 56 slightly rotates in the direction to leave the elastic arm 55c following the one-step advancement of the counter disk 49, reducing the bias to the elastic arm 55c. Because the rotation of the sprocket 27 during the initial advancement is transmitted to the locking cam 54, the locking lever 55 is in a state where the locking cam 54 at the engaging claw 55a is pushed by the outer circumference 54b and remains in the retreated position. Consequently, the upward projection 55b of the locking lever 55 comes into the space 57b of the locking lever actuator cam ring 57. Furthermore, since one end 57c of the locking lever actuator cam ring 57 has been brought into engagement with the upward projection 55b through the forward stepping of the counter disk 49, the locking lever 55 is prevented from rotating toward the locking position. This end 57c is tapered to lead smoothly the upward projection 55b toward the inner wall of 57b of the locking lever actuator cam ring 57.

Thereafter, when the shutter button 39 is depressed, as explained in connection with FIG. 11, the stopping lever 35 at the downward leg 35c is pushed by the rod 39a to rotate toward the retreated position. In the middle of this rotation, the engagement between the upward projection 36c and the downward projection 35d is released, and the shutter drive lever 36 is moved by the torsion spring 37 toward the releasing position. Meanwhile, the shutter blade 42 is kicked away and exposure is made.

As described previously, the shutter drive lever 36 in the releasing position holds the stopping lever 35 in the retreated position, turning on the switch 46 and allowing another advancing movement of the filmstrip 12. When the shutter button 39 is released, the switch 40 is turned off to cause the forward rotation of the motor 24. Due to the forward rotation of the motor 24, the cartridge spool 3 is rotated by the spool drive shaft 20 in the film advancing direction to expel the filmstrip 12. Then, the sprocket 27 makes a full rotation to the film wind stopping position again, halting the motor 24 after having stopped the filmstrip 12 with a picture frame position in alignment with the exposure aperture 17. During this series of operation, the shutter charging and one-step advancement of the counter disk 49 are performed.

Figure 13:
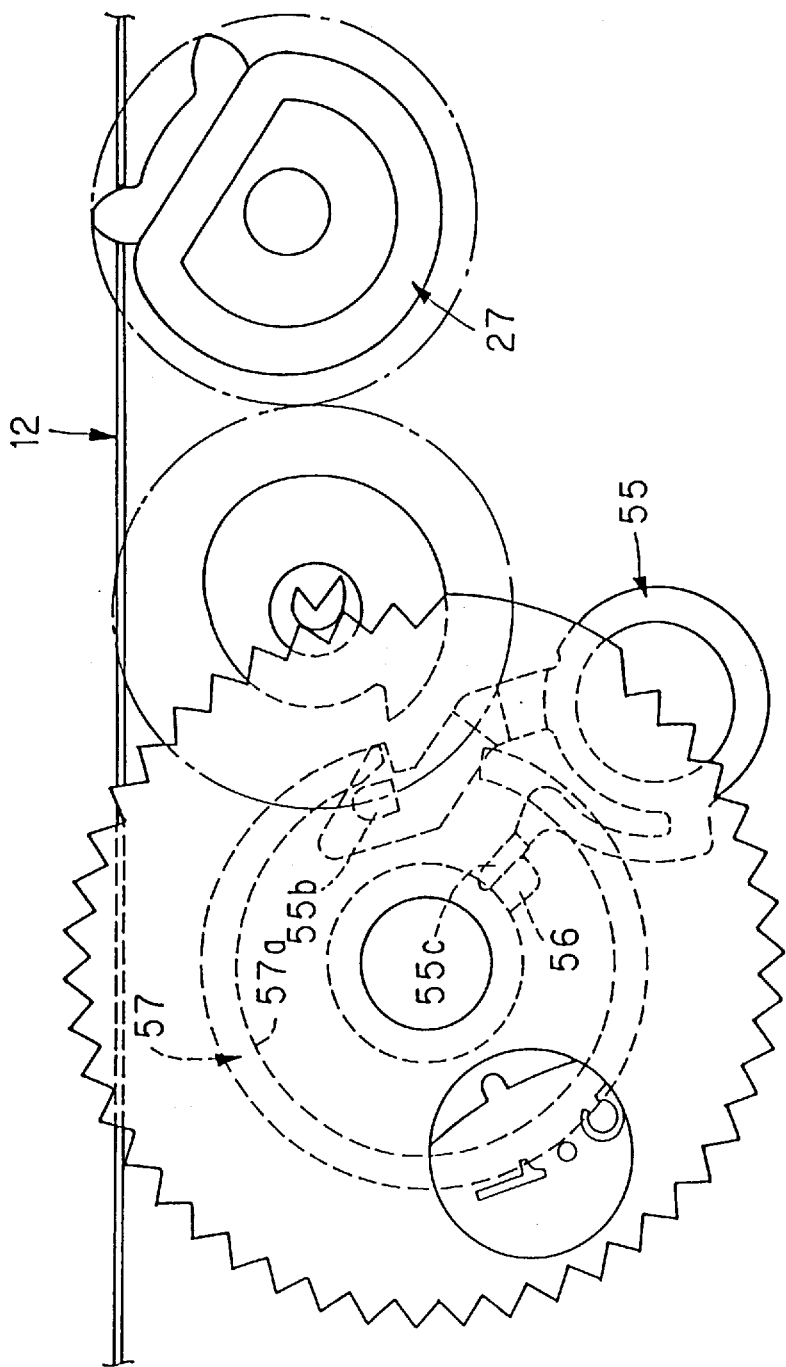
FIG. 13 is an explanatory view showing the sprocket, the locking mechanism and the counter mechanism when the second picture frame is in the exposure position.

As shown in FIG. 13, the locking mechanism causes the locking lever biasing projection 56 to rotate in the direction to leave away from the elastic arm 55c following one-step advancement of the counter disk 49 during the film advancement, removing the bias to the elastic arm 55c. Together, following the one-step advancement of the counter disk 49 during the film advancement, the inner wall 57a of the locking lever actuator cam ring 57 comes onto the outer side of the upward projection 55b (on the side of the cam shaft 32), preventing the locking lever 55 from rotating toward the locking position.

Figure 14:
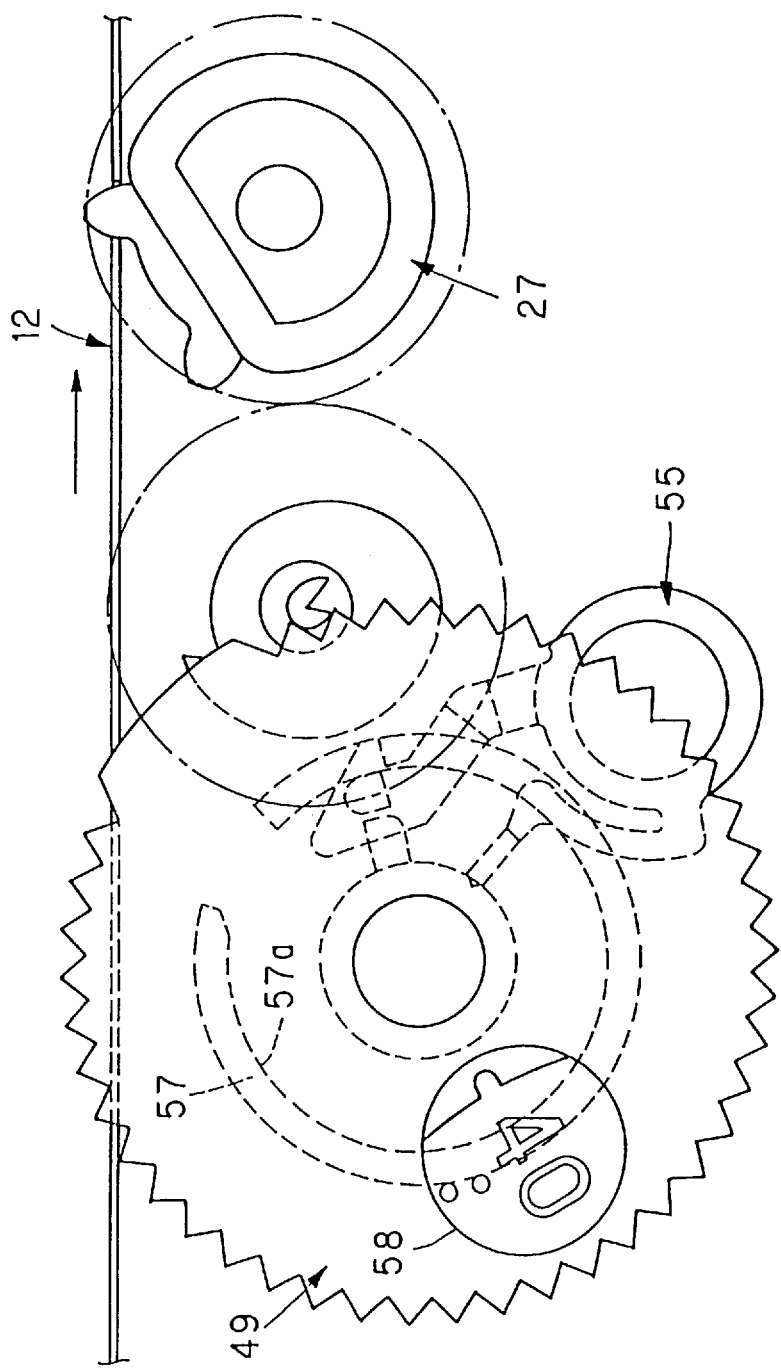
FIG. 14 is an explanatory view showing the sprocket, the locking mechanism and the counter mechanism when the last picture frame is in the exposure position and film winding is prohibited.

In the same way as explained above, the filmstrip 12 is wound following only the depression of the shutter button 39, and exposures are made sequentially one after another. Then, while advancing the filmstrip 12 after the filmstrip 12 is fully exposed, the trailing end detection claw 50 comes into the film end perforation 16, preventing the filmstrip 12 from being further advanced. Afterward, the motor 24 stops when the voltage accumulated in the condenser 24b has lowered to the specified level at the time t4 (see FIG. 8). At the completion of winding the filmstrip 12, as shown in FIG. 14, the counter disk 49 indicates the prescribed number of exposure, "40" for example, in the display window 58. At this time, the locking lever 55 remains prevented by the inner wall 57a of the locking lever actuator cam ring 57 from rotating to the locking position.

Figure 15:
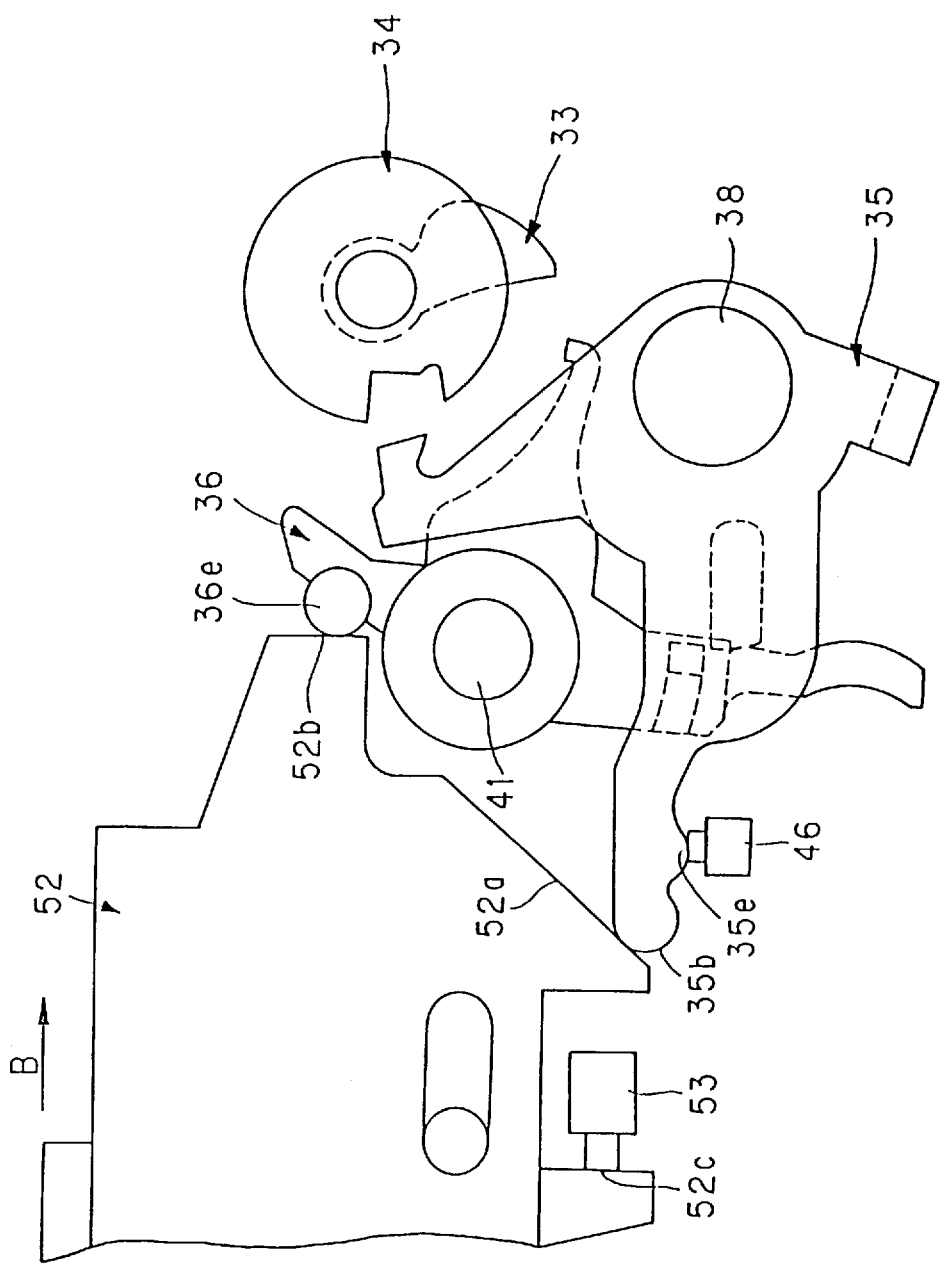
FIG. 15 is an explanatory view showing the film wind stopping mechanism and the shutter charging mechanism during film rewinding.

After checking this indication in the display window 58, the film rewind knob 52 is slid in the direction indicated by an arrow B shown in FIG. 15 to cause both pressing sections 52a and 52b to push the pressure receiving ends 35b and 36e, respectively, forcing the stopping lever 35 and the shutter drive lever 36 to the retreated position and the charging position, respectively, and holding them in those positions. Resultingly, the transmission of rotation of the sprocket 27 to both these mechanisms is shut off, enabling the sprocket 27 to be free. Simultaneously, the switching projection 52c of the film rewind knob 52 turns on the switch 53, reversing the motor 24.

Immediately after the motor 24 starts to rotate in the reverse direction, the spool drive shaft 20 rotates in the rewind direction, rewinding the filmstrip 12 into the interior of the film cartridge 11. At this time, the sprocket 27 is rotated by the filmstrip 12 in the rewind direction with the cogs 27a and 27b remaining engaged with the perforations 14. The rotation of the sprocket 27 is transmitted to the exposure counter mechanism, rotating the single-cog gear 48 to move back the counter disk 49 to the starting position. During rewinding the filmstrip 27, the locking lever 55 is prevented by the inner wall 57a of the locking lever actuator cam ring 57 from rotating toward the locking position.

Figure 16:
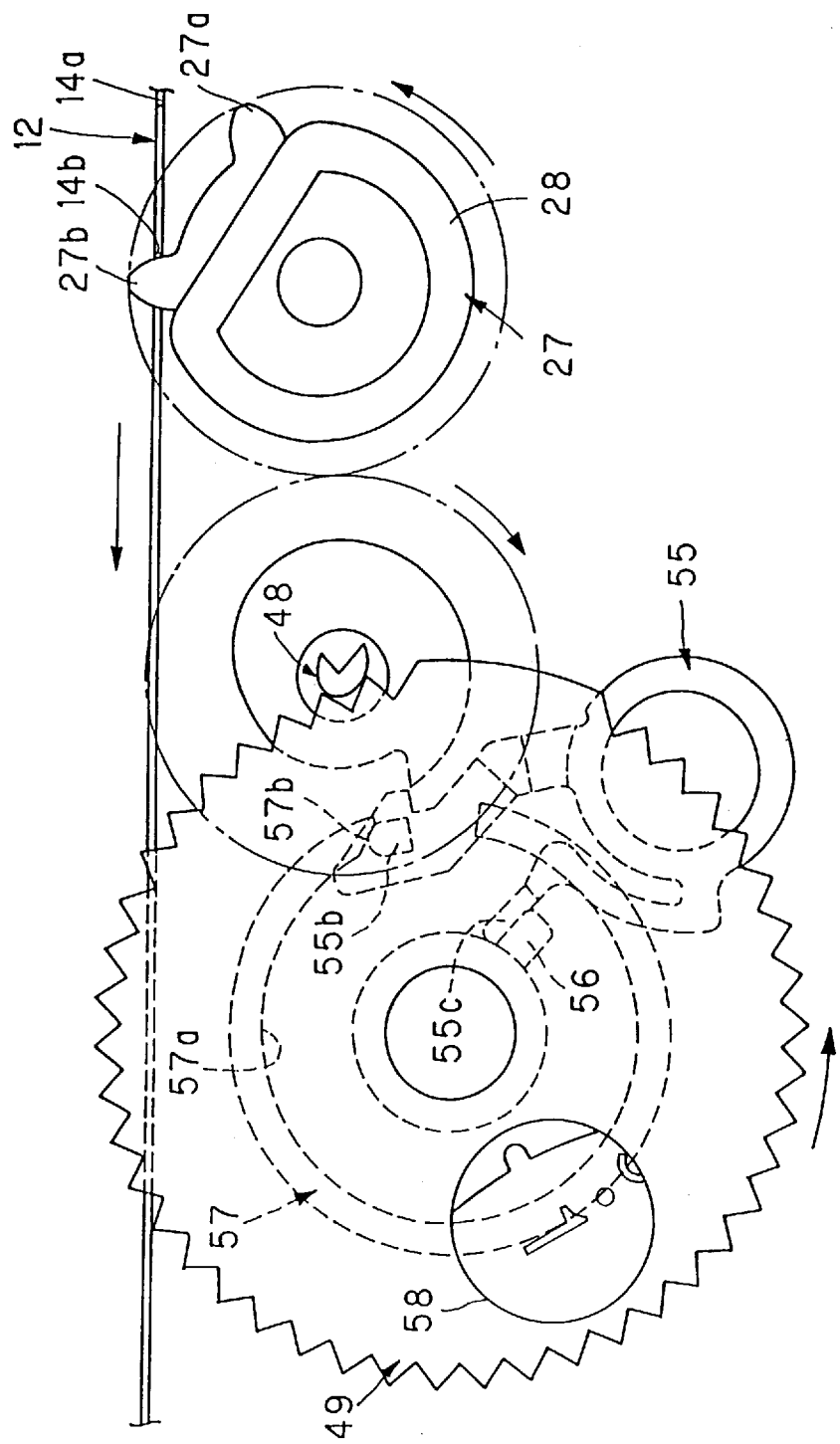
FIG. 16 is an explanatory view showing the sprocket, the locking mechanism and the counter mechanism when the filmstrip is rewound to the first picture frame.

While the filmstrip 12 is continued to be rewound, when the counter disk 49 indicates the exposure number "1" in the display window 58, the first picture frame 15a of the filmstrip 12 has passed the exposure aperture 17 and, however, the following cog 27b of the sprocket 27 remains engaged with the perforation 14b, as shown in FIG. 16. At this time, although the locking lever biasing projection 56 pushes the elastic arm 55c to urge the locking lever 55 toward the locking position, because one end of the space 57b of the locking lever actuator cam ring 57 still remains engaged with the upward protrusion 55b of the locking lever 55, the locking lever 55 continues to be prevented from rotating to the locking position. Besides, because the pressure caused in the locking lever 55 by the locking lever biasing projection 56 is absorbed through an elastic deformation of the elastic arm 55c, the locking lever 55 is not damaged.

Figure 17:
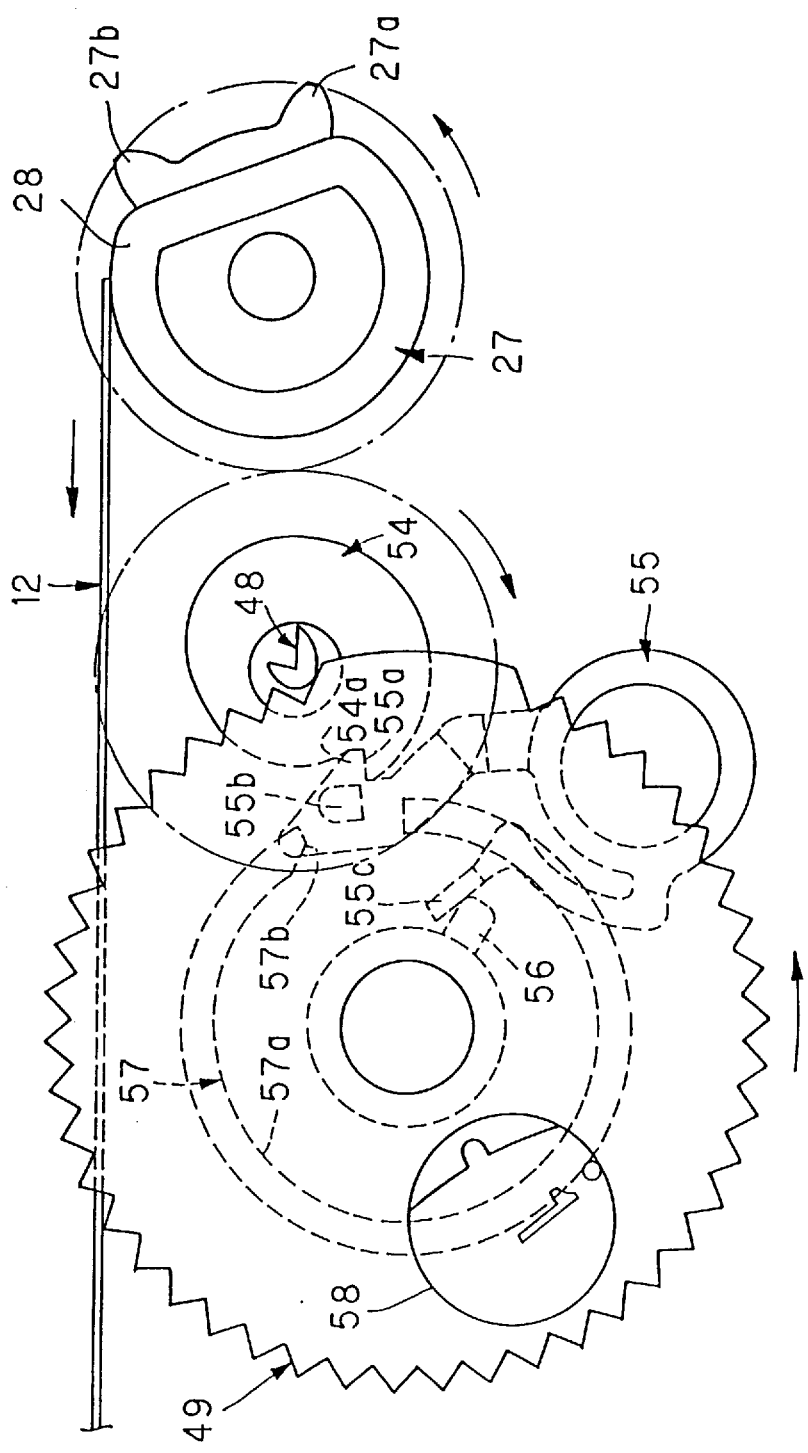
FIG. 17 is an explanatory view showing the sprocket, the locking mechanism and the counter mechanism when the leading end comes off the sprocket during film rewinding.

Subsequently, the sprocket 27 is rotated in the counterclockwise direction by the filmstrip 12 by means of engagement between the perforations 14b and 14a with the cogs 27a and 27b, respectively, making a full turn of the single-cog gear 48 to move back the counter disk 49 by one count, returning the counter disk 49 to the starting position with a result of bringing the space 57b of the locking lever actuator cam ring 57 into the rotational locus of the upward projection 55b. Accordingly, not only because the rotation of the locking lever 55 to the locking position is allowed but because the locking lever biasing projection 56 further pushes and elastically deforms the elastic arm 55c, the locking lever 55 instantaneously rotates to the locking position, which is accompanied by rotation of the locking cam 54 in the clockwise direction following rotation of the sprocket 27. As shown in FIG. 17, when the claw 55a of the locking lever 55 engages with the peripheral jaw 54a of the locking cam 54 to prevent the locking lever 55, and hence the sprocket 27, from further rotation. The filmstrip 12 is, thereafter, rewound remaining in contact with the rubber band 28 of the sprocket 27.

When the exposed film 12 is entirely rewound inside the film cartridge 11, the motor 24 is unloaded and changes sound. This sound change, which may provide incongruous feeling to the photographer, presses him or her to visually check the indication of the display window 58. The sign "S" in the display window 58 drives the photographer to slide back the film rewind knob 52 in the direction opposite to the arrow B shown in FIG. 15, so as thereby to finish the film rewinding. The sliding operation of the film rewind knob 52 causes the film wind stopping mechanism and the shutter charging mechanism to return from the state shown in FIG. 15 to the state shown in FIG. 10 which is the initial state of these mechanisms. Namely, both pressing sections 52a and 52b of the film rewind knob 52 releases the pressure against the pressure receiving sections 35b and 36e of the stopping lever 35 and the shutter drive lever 36, respectively. Since the pressing section 52a is tapered, the pressing section 52a performs pressure releasing faster than the pressing section 52b, permitting the stopping lever 35 to return to its stopping position more faster by the bias of the torsion spring 37. In this instance, since the locking lever 55 holds the sprocket 27 in the proper stopping position, and the groove 34a of the film wind stopping cam 34 remains directed at an angle suitable to receive the engaging claw 35a of the stopping lever 35, the stopping lever 35 is returned by the torsion spring 37 and turns off the switch 46, stopping the motor 24.

The faster return of the stopping lever 35 to the stopping position causes the downward projection 35d of the stopping lever 35 comes into the rotational locus of the upward projection 36c of the shutter drive lever 36 and holds the shutter drive lever 36 in the charging position before the shutter drive lever 36 rotates toward the releasing position by the bias of the torsion spring 37, recovering the initial state shown in FIG. 10. Following the return of the film rewind knob 52, the switch 53 changes over to place the motor 24 ready for forward rotation.

In this initial state, because the engaging claw 35a of the stopping lever 35 is in engagement with the groove 34a of the film wind stopping cam 34, the sprocket 27 is prevented from rotating following advancement of the filmstrip 12. Accordingly, the sprocket 27 is prevented not only from rotating in the forward direction by the stopping lever 35 but also from rotating in the reverse direction by the locking lever 55, so as to be firmly held in the initial position and prevented from deviating from the initial position even if the camera is shaken for example. In particular, the claw 55a of the locking lever 55 and the peripheral jaw 54a of the locking cam 54, which are shaped so as to be convenient for gnawing engagement, provides reliable and secured positional control of the sprocket 27 at the completion of film rewinding.

After the completion of film rewinding, the bottom cover of the camera body is opened and the film cartridge 11 containing the exposed filmstrip 12 is taken out. At this time, the drive shaft 23 rotates following the opening action of the bottom cover to move the light lock door of the film cartridge 11 to the locking position. The film cartridge 11 taken out of the camera protects the filmstrip 12 from being exposed to the ambient light.

If the shutter button 39 is operated without loading the film cartridge 11 in the camera, the film wind stopping mechanism and the shutter charging mechanism assume the state shown in FIG. 11, allowing the motor 24 to rotate in the forward direction in response to releasing the shutter button 39. However, because the film cartridge 11 is not in the cartridge chamber of the camera, no filmstrip is withdrawn from the cartridge chamber, causing no operation of both sprocket 27 and counter disk 49 and holding them in the state shown in FIG. 9. On the other hand, the motor 24 automatically stops when the voltage accumulated in the condenser 24b lowers to the specified level, the camera does not encounter any problem due to the vacancy of the cartridge chamber. If a switch is installed such that the condenser 24b is short-circuited when a film cartridge 11 is unloaded and made alive when it is loaded, the motor 24 is never activated when the camera is not loaded with a film cartridge and consequently, the life of a battery is extended.

Further, although, if the shutter button 39 is operated without loading the film cartridge 11 in the camera, the film wind stopping mechanism and the shutter charging mechanism has assumed the state where the stopping lever 35 is in the retreated position and the shutter drive lever 36 is in the releasing position as shown in FIG. 11, the motor 24 is driven immediately after shutter release operation after having loaded the film cartridge 11 to make the sprocket 27 rotate following the advancement of the filmstrip 12, performing the shutter charging until the sprocket 27 reaches the stopping position, thus the camera does not encounter any problem.

Although, in the above embodiment, the one-frame film advancement is performed by one rotation of the sprocket 27, this invention is not limited to this embodiment but may adopt a film winding mechanism of such a type that the one-frame film advancement is performed by a half rotation of a sprocket. In this case, the sprocket is provided with two pairs of cogs 27a and 27b, these two each pair of cogs being installed 180° apart on the circumference of the intermittent sprocket 27 and the cogs 27a and 27b of each pair being separated at the short interval L1. In addition, the shutter charging mechanism has to include two shutter charging cams arranged in diametrically opposing positions on the circumference so than each cam being adapted to push the shutter drive lever 36 up to the charging position through every half rotation of the sprocket, and the film wind stopping mechanism has to include two grooves formed in diametrically opposing positions on the circumference of the film wind stopping cam 34 so that the engaging claw 35a of the stopping lever 35 is brought into engagement with each groove through every half rotation of the intermittent sprocket.

What is claimed is:

1. A camera for use with a filmstrip having a row of perforations separated at alternate short and long intervals in a side margin of said filmstrip such that a picture frame is defined between adjacent two of said perforations at said long interval and an interval between adjacent two picture frames is defined between adjacent two of said perforations at said short interval, said camera comprising:

a sprocket having at least a pair of cogs formed on a periphery and engageable with said perforations, said periphery being divided by said cogs into a frictional engaging section which provides frictional engagement of said periphery with said filmstrip by means of which said sprocket rotates following movement of said filmstrip and a mechanically engaging section which provides mechanical engagement of said cogs with said perforations by means of which said sprocket rotates following movement of said filmstrip;

a shutter charging mechanism cooperative with said sprocket for performing shutter charging by means of rotation of said sprocket driven by said filmstrip through said mechanical engagement between said filmstrip and at least part of said mechanically engaging section of said sprocket;

switch over means for operationally disconnecting said sprocket and said shutter charging mechanism in response to rewinding said filmstrip to permit said sprocket to rotate following rewinding movement of said filmstrip; and locking means for preventing reverse rotation of said sprocket in a position out of a section where said shutter charging mechanism performs shutter charging for a period from when said cogs come off from foremost two of said perforations to when a leading end of said filmstrip leaves from said sprocket.

2. A camera as defined in claim 1, and further comprising an exposure counter disk for indicating a number of exposures, said exposure counter disk stepping from a start position following rotation of said sprocket for advancing movement of one picture frame and stepping back to said start position following reverse rotation of said sprocket for rewinding movement of said filmstrip.

3. A camera as defined in claim 1, and further comprising means for preventing forward rotation of said sprocket in a position where said shutter charging mechanism completes shutter charging after having rewound a full length of said filmstrip, said means being activated to prevent said forward rotation of said sprocket in response to movement of manually operative rewinding means to an initial position and deactivated to permit said forward rotation of said sprocket following movement of said filmstrip.

* * * * *